United States Patent [19]
Weigand et al.

[11] Patent Number: 5,784,368
[45] Date of Patent: Jul. 21, 1998

[54] METHOD AND APPARATUS FOR PROVIDING A SYNCHRONOUS COMMUNICATION ENVIRONMENT

[75] Inventors: David L. Weigand, Buffalo Grove; Charles John Malek, Crystal Lake, both of Ill.

[73] Assignee: Motorola, Inc., Schaumburg, Ill.

[21] Appl. No.: 311,467

[22] Filed: Sep. 23, 1994

[51] Int. Cl.$^6$ ............................................. H04J 3/06
[52] U.S. Cl. ................................... 370/310; 455/502
[58] Field of Search .................. 370/18, 98, 29, 370/103, 100.1, 105.3, 95.1, 95.3, 324, 350, 503, 507, 509, 510, 512; 375/356, 354; 455/51.1, 56.1, 71, 13.3, 51.2, 524, 502, 503

[56] References Cited

U.S. PATENT DOCUMENTS

| | | |
|---|---|---|
| 3,983,498 | 9/1976 | Malek . |
| 4,626,914 | 12/1986 | Breimer . |
| 4,696,052 | 9/1987 | Breeden . |
| 4,887,266 | 12/1989 | Neve et al. . |
| 4,901,368 | 2/1990 | Arnold et al. ............ 370/74 |
| 5,117,441 | 5/1992 | Weigand . |
| 5,124,698 | 6/1992 | Mustomen . |
| 5,144,668 | 9/1992 | Malek et al. . |
| 5,212,715 | 5/1993 | Pickert et al. . |
| 5,257,404 | 10/1993 | Goreham et al. ............ 375/356 |
| 5,260,944 | 11/1993 | Tomabechi ............ 370/95.1 |
| 5,285,443 | 2/1994 | Patsiokas et al. . |
| 5,287,384 | 2/1994 | Avery et al. . |
| 5,293,423 | 3/1994 | Dahlin et al. . |
| 5,293,645 | 3/1994 | Sood . |
| 5,327,581 | 7/1994 | Goldberg ............ 375/356 |
| 5,388,102 | 2/1995 | Griffith et al. . |
| 5,448,570 | 9/1995 | Toda et al. ............ 370/103 |

FOREIGN PATENT DOCUMENTS

| | | |
|---|---|---|
| 578506A2 | 7/1993 | European Pat. Off. . |
| 592209A1 | 10/1993 | European Pat. Off. . |
| 626796A1 | 5/1994 | European Pat. Off. . |
| 94/18764 | 9/1994 | WIPO . |
| 94/22245 | 9/1994 | WIPO . |
| 94/28643 | 12/1994 | WIPO . |

*Primary Examiner*—Douglas W. Olms
*Assistant Examiner*—Ajit Patel
*Attorney, Agent, or Firm*—John J. King

[57] ABSTRACT

An apparatus and method provides synchronous communication in a communication environment (102) wherein multiple base stations are adapted to operate on the same frequencies. In particular, the base stations which operate within range of one another must be coordinated to minimize interference with other base stations which may otherwise operate independently. Each base station operating in a system will determine whether another base station operating on the same frequencies is within range (310). One of the base stations will assume a role as a master and the remaining base station will then synchronize to the master base station (312). The preferred methods for synchronizing the base stations includes signaling protocols (702, 902) and collision avoidance techniques for digital multiple access communication systems.

5 Claims, 10 Drawing Sheets

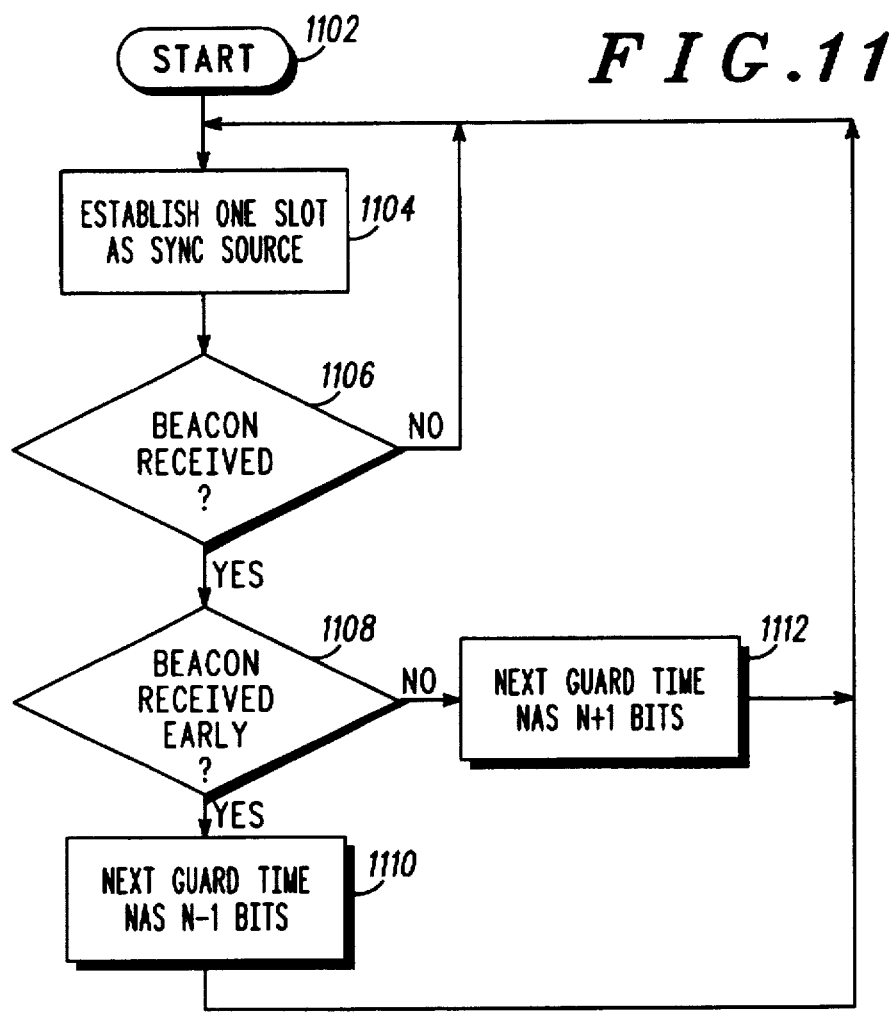

5,784,368

METHOD AND APPARATUS FOR PROVIDING A SYNCHRONOUS COMMUNICATION ENVIRONMENT

FIELD OF THE INVENTION

This invention is related to radio frequency (RF) communication systems, and more particularly to a method and apparatus for providing a synchronous communication environment.

BACKGROUND OF THE INVENTION

In wireless communication systems, effort has been made to increase the use of spectrum to allow for a greater number of users of a given frequency band. One example of a technique to increase spectrum efficiency is a frequency division multiple access (FDMA) technique. In a conventional FDMA system, a given frequency band is divided into a number of channels, wherein each channel is occupied by one user. An FDMA system can also be a time division duplex (TDD) system wherein a given RF channel is used for both forward and reverse directions of communication which are separated in time.

Other techniques comprise digital multiple access communication systems. One such conventional digital multiple access technique for increasing efficiency of the use of spectrum is a time division multiple access (TDMA) technique. In a TDMA system, each channel for the transmission of signals is divided into a plurality of slots. Each time slot may be allocated to a different call. A TDMA system can also employ TDD techniques. Accordingly, a number of calls can be simultaneously transmitted on a single channel or frequency.

Finally, increased spectrum efficiency can be achieved by spread spectrum techniques, in the form of either a slow frequency hopper system or a direct-sequence CDMA system. In a slow frequency hopper system, the carrier frequency of the signal is changed at a predetermined rate over a wide range of possible frequencies in a pseudo-random sequence known in advance by the receiver. Generally, spread spectrum techniques reduce the effects of both intentional or unintentional interference. Direct sequence CDMA systems allow multiple users to share the same spectrum wherein each user is assigned a unique psuedonoise code sequence. The signal is spread by the wide bandwidth pseudo-noise sequence known in advance by the receiver.

In digital multiple access communicationsystems having multiple base stations, there must be some coordination among the base stations to ensure that the base stations are properly synchronized. Synchronizing the base stations can be accomplished if the base stations are a part of a common system and are physically connected. However, base stations which are not physically connected must be synchronized if they are part of a common system. Further, if the base stations operate independently on common frequencies, the base stations must communicate to be properly synchronized. Accordingly, there is a need for a method and apparatus for synchronizing base stations operating in a digital multiple access communication system.

BRIEF DESCRIPTION OF THE DRAWINGS

FIG. 11 is a flow diagram showing digital phase lock loop operation for a base with a synchronization source.

DESCRIPTION OF THE PREFERRED EMBODIMENTS

In a digital multiple access communication system, each base station operating within range of another base station must be synchronized to prevent interference. The present invention provides synchronous communication in a communication environment wherein multiple base stations are adapted to operate on the same frequencies. In particular, the base stations such as residential base stations must be coordinated to minimize interference with other base stations which otherwise operate independently. According to the present invention, each base station operating in a system will determine whether another base station operating on the same frequencies is within range. One of the base stations will assume a role as a master and the remaining base station will then synchronize to the master base station. Preferred methods for synchronizing the base stations, including signaling protocols, synchronization chain building and collision avoidance techniques for building synchronization chains, are also disclosed.

Figure 1:
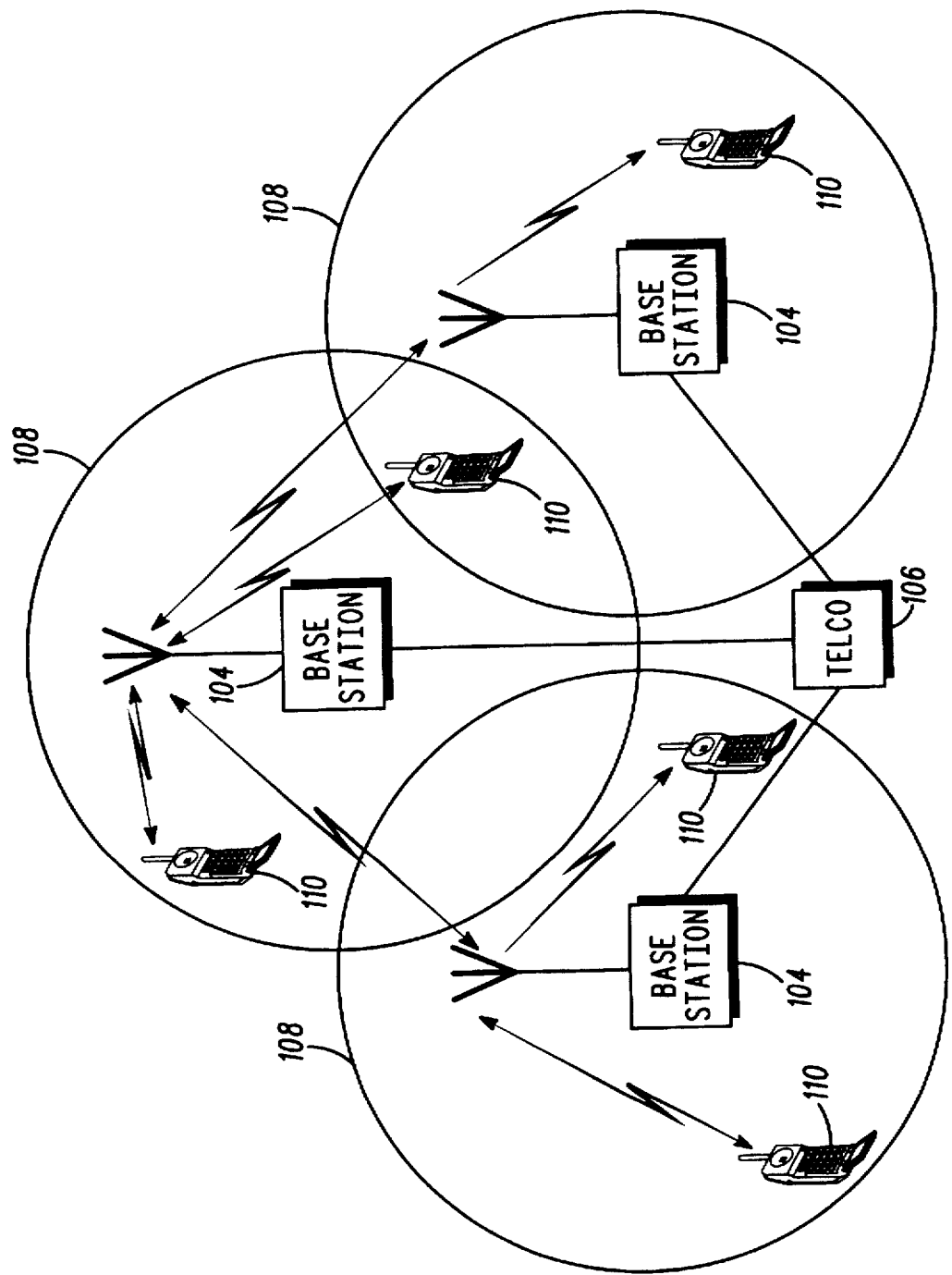
FIG. 1 is a plan view of a wireless communication system having multiple base stations coupled to the public system telephone network.

Turning first to FIG. 1, a wireless communication system 102 is shown. The wireless communication system has a plurality of base stations 104, each of which provide RF coverage over an area 108. Each base station may be coupled to a public system telephone network 106. However, it will be understood that the circuit and method of the present invention could be implemented in a wireless communication system having base stations which are not coupled to a public system telephone network. The base stations could be coupled together in an independent network, or could be stand alone units which happen to be operating in the same frequency bands. Each base station is also adapted to communicate with one or more handsets 110. Finally, each base station can communicate with another base station which is within range by way of RF signals.

Figure 2:
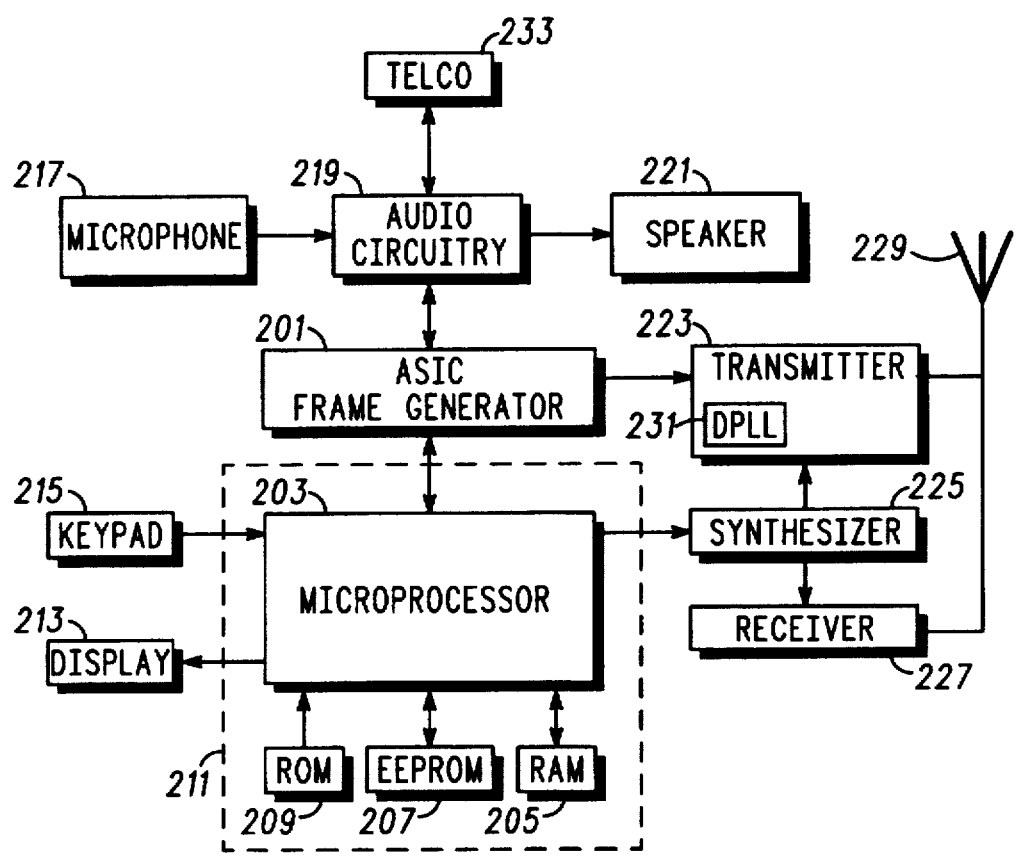
FIG. 2 is a block diagram of circuitry for a conventional wireless base station or handset.

Turning now to FIG. 2, a block diagram shows a conventional base or handset circuit. In the preferred embodiment, an ASIC (Application Specific Integrated Circuit) 201, such as a CMOS ASIC in the MDA08 technology or H4C also available from Motorola, Inc. and microprocessor 203, such as a 68HC11 microprocessor available from Motorola, Inc., combine to generate the communication protocol shown in FIGS. 7 and 9. ASIC 201 preferably includes a separate search engine to detect a second synchronization source according to the present invention. The second search engine could be a separate digital phase lock loop (DPLL) or an oversampled cross-correlator. Digital phase lock loops are well known in the art. An example of a digital phase lock loop can be found in U.S. Pat. No. 3,983,498 entitled "Digital Phase Lock Loop" which issued on Sep. 28, 1976 to Malek. The entire contents of U.S. Pat. No. 3,983,498 is incorporated by reference. An example of an oversampled cross-correlator can be found in U.S. Pat. No. 5,117,441 entitled "Method and Apparatus For Real Time Demodulation of a GMSK Signal By A Non-Coherent Receiver" issued on May 26, 1992 to Weigand. The entire contents of U.S. Pat. No. 5,117,441 is also incorporated by reference.

The microprocessor 203 uses RAM 205, EEPROM 207, and ROM 209, consolidated in one package 211 in the preferred embodiment, to execute the steps necessary to generate the protocol and to perform other functions for the communication unit, such as writing to a display 213, accepting information from a keypad 215, and controlling a frequency synthesizer 225. The ASIC 201 processes audio transformed by the audio circuitry 219 from a microphone 217 and to a speaker 221. Certain message fields are constructed by the ASIC 201 and populated by the audio circuitry 219, the microprocessor 203, and others are constructed by the ASIC 201, which generates the message frame and transfers it to a transmitter 223. Transmitter 223 transmits through an antenna 229 using carrier frequencies produced by the frequency synthesizer 225 in the hopping manner chosen for the system and directed by the microprocessor 203. Information received by the communication unit's antenna 229 enters the receiver 227 which demodulates the symbols comprising the message frame using the carrier frequencies from the frequency synthesizer 225, in accord with the hopping manner chosen for the system. The ASIC 203 then parses the received message frame into its constituent parts. If the circuitry of FIG. 2 is incorporated in a residential base station, the audio circuitry of the base station may be coupled to a telco network 233.

Figure 3:
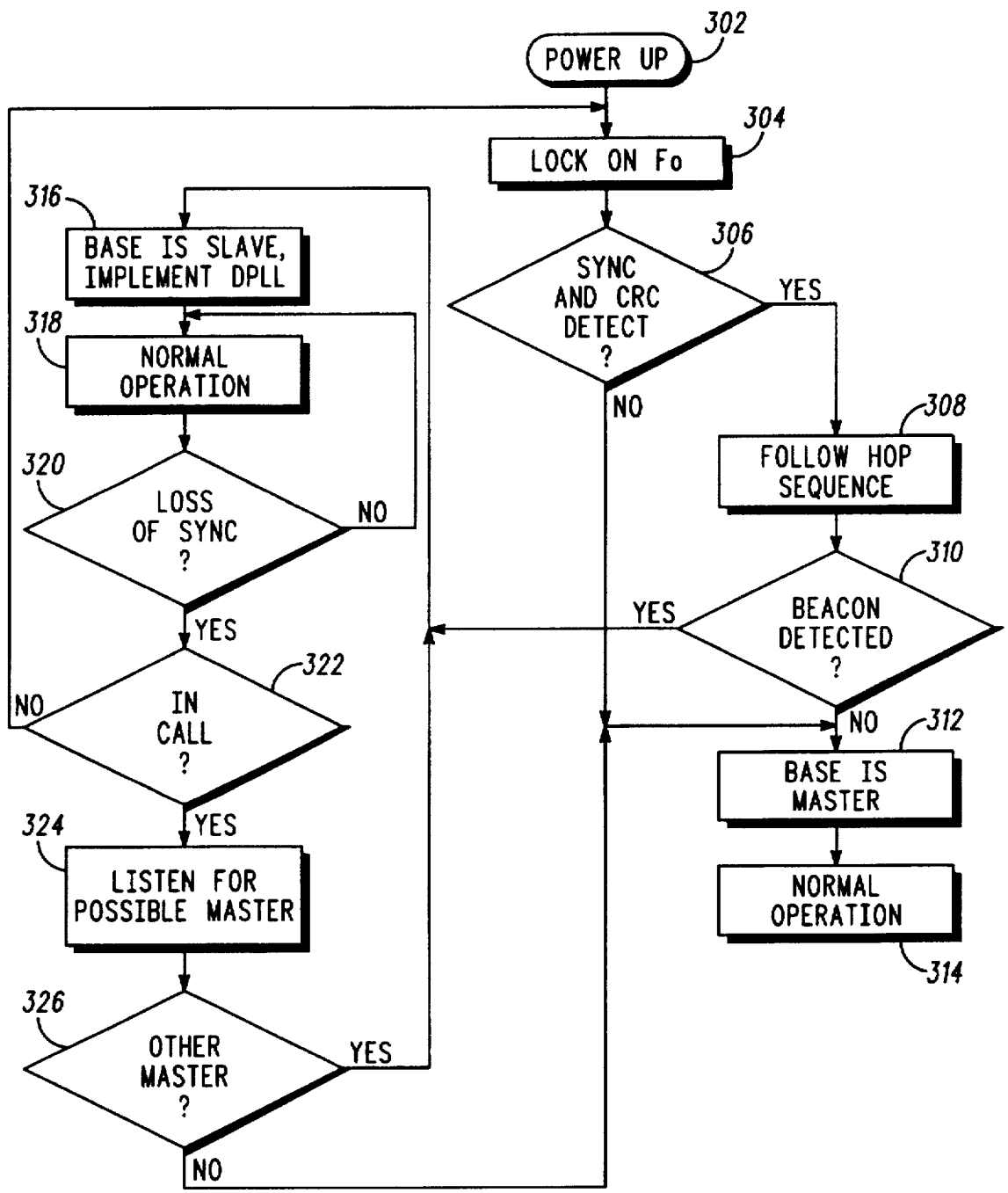
FIG. 3 is a flow diagram showing the preferred steps for determining master and slave designations for base station and chain building in the wireless communication system of FIG. 1.

Turning now to FIG. 3, a flow diagram shows the preferred steps for determining whether a particular base station in a wireless communication system having a plurality of base stations operating within range of one another is a master base station. The method of the present invention is preferably employed in a personal cordless base station, such as a residential or office base station, but could be employed in any system employing wireless base stations. The base station is powered up at a step 302 and locks on a frequency fo at a step 304. At a step 306, the base station determines whether synchronization and cyclic redundancy check (CRC) signals are detected at a step 306. If the signals are detected, the base station follows a hop sequence at a step 308. Frequency hopping systems are well known in the art and will not be described in detail in this application. The base station then determines whether a beacon is heard at a step 310. This signal could be a beacon message generated by another source, or could be communication traffic generated by another source, such as a handset or base. If no beacon is detected at step 310, the base station assumes a role as a master base station at a step 312 and assumes normal operation at a step 314. As a master base station, the base station will hop between the various frequencies, while the other base stations will maintain synchronization with the master base station (i.e. follow the same frequency hopping pattern, but out of phase with the master, on a different hop index).

However, if a beacon is detected by the base station at step 310, the base assumes a slave role at a step 316 and implements a digital phase lock loop (DPLL). The base station assumes normal operation at a step 318, and determines whether it has lost synchronization with a master station at a step 320. If the base station has lost synchronization, it then determines whether it is in a call at a step 322. If the base station is not in a call, it locks on a frequency fo at step 304. However, if the base station is in a call, it listens for a possible master base station at a step 324. If the base station detects another master at a step 326, the base station assumes a slave role at step 316. The preferred methods for detecting a base station will be described in detail in reference to FIGS. 7–10. If no master is detected, the base station assumes a master role at step 312.

Figure 4:
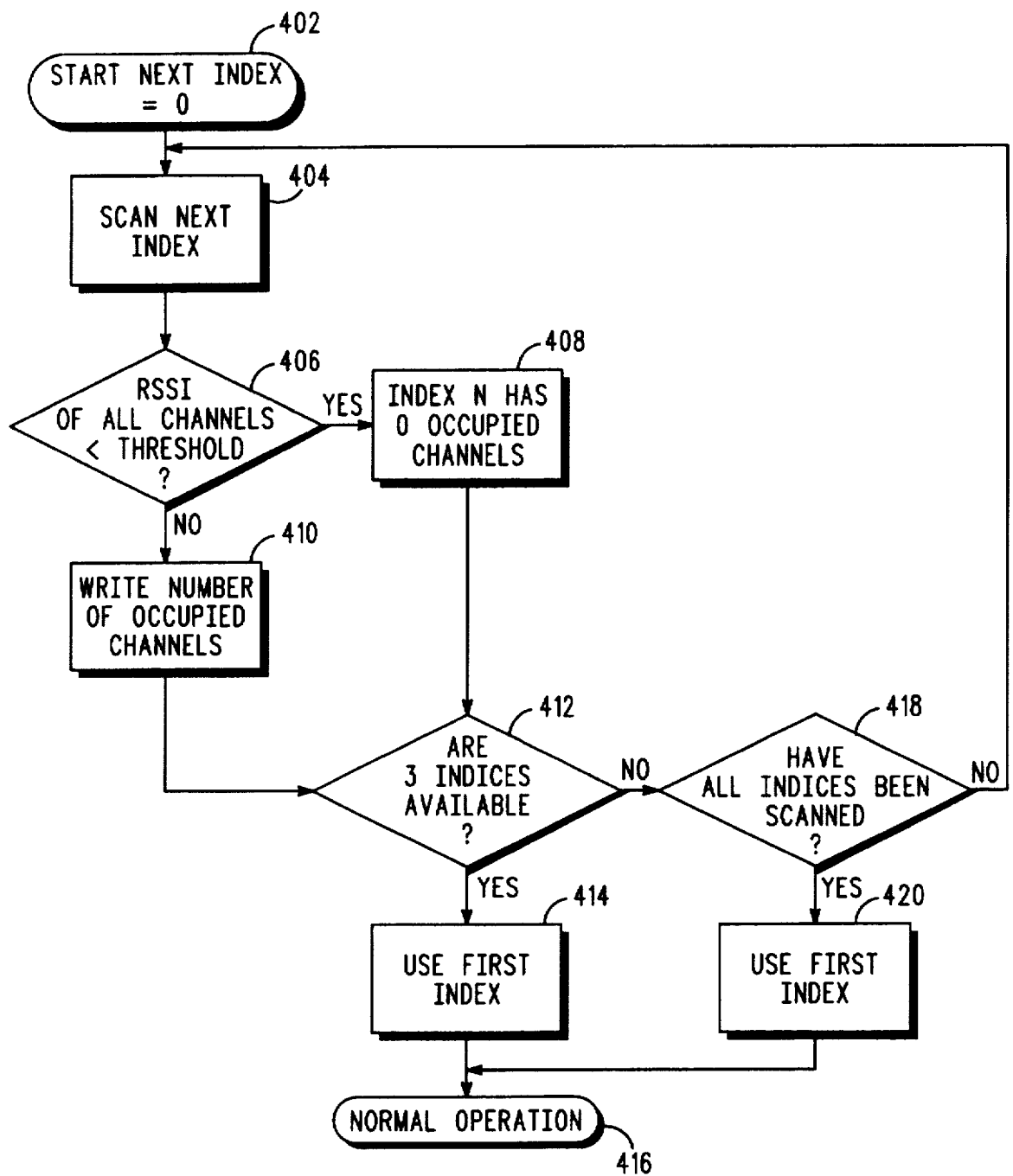
FIG. 4 is a flow diagram for showing the preferred steps for determining an available index in a slow frequency hopper system.

Turning now to FIG. 4, the preferred steps for following the hop sequence in block 308 of FIG. 3 is shown. At a step 402, the index (i.e. an offset into a predetermined sequence of channels starting with a first channel) is set equal to zero. At a step 404, the base station scans the next index (same sequence of channels starting the second channel in the sequence) and determines if the receiver signal strength indicator (RSSI) of all channels is less than predetermined threshold at a step 406. If the RSSI of all channels is less than a predetermined threshold, the base station stores an indication that index N has zero occupied channels at a step 408. If the RSSI of all channels is not less than a threshold at step 406, the base station indicates the number of occupied channels at a step 410.

At a step 412, the base station determines whether three indices are available having no occupied channels. If three indices are available, the base station selects the first index at a step 414 and assumes normal operation at a step 416. However, if three indices are not available, the base station determines whether all indices have been scanned at a step 418. If all indices have not been scanned, the base station scans the next index at step 404. If all indices have been scanned, the base station uses the best available index depending on the least number of occupied channels having an RSSI value greater than a predetermined threshold. The three indices are used to form a next best list. If the index is corrupted during a call, a request could be sent to change the index. The next best list may be periodically updated depending upon radio resources and other limitations. While the RSSI determination is described above, evaluation of channel quality by RSSI is merely given by way of example. Any other method for determining signal quality could be used within the scope of the present invention.

Figure 5:
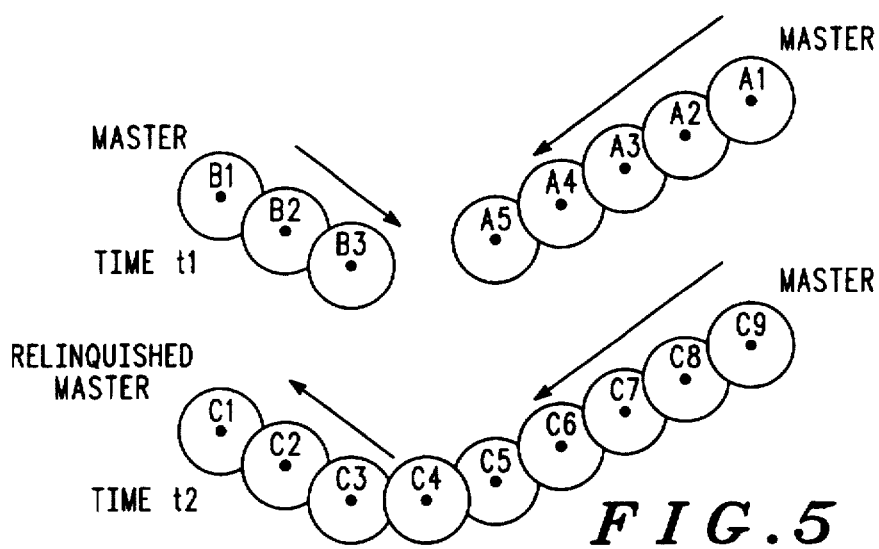
FIG. 5 is a network topological diagram showing the coordination of overlapping base stations in a wireless communication systems.

Turning to now to FIG. 5, a timing diagram shows the synchronization of base stations which are within range of one another according to the present invention. Original masters A1 and B1, which are out of range of one another, are shown at time T1. Other base stations (A2 through A5) come within range of the original master A1 and synchronize to form a synchronization chain according to the steps described in FIG. 6. Similarly, base stations B2 and B3 come within range of the original master B1 to form another synchronization chain.

Figure 6:
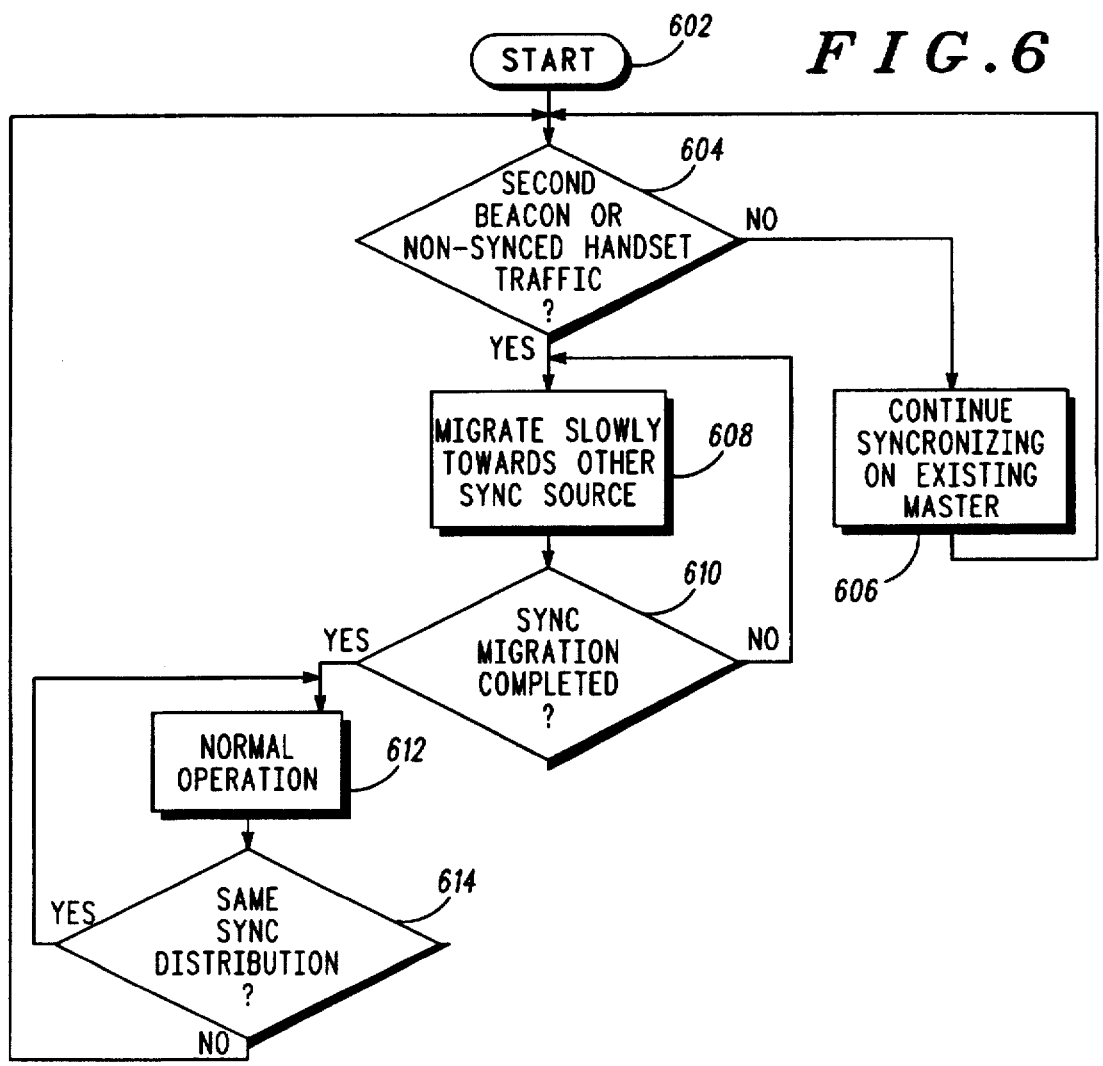
FIG. 6 is a flow chart showing the general steps for the coordination of base stations during chain reversal as shown in FIG. 5.
Figure 9:
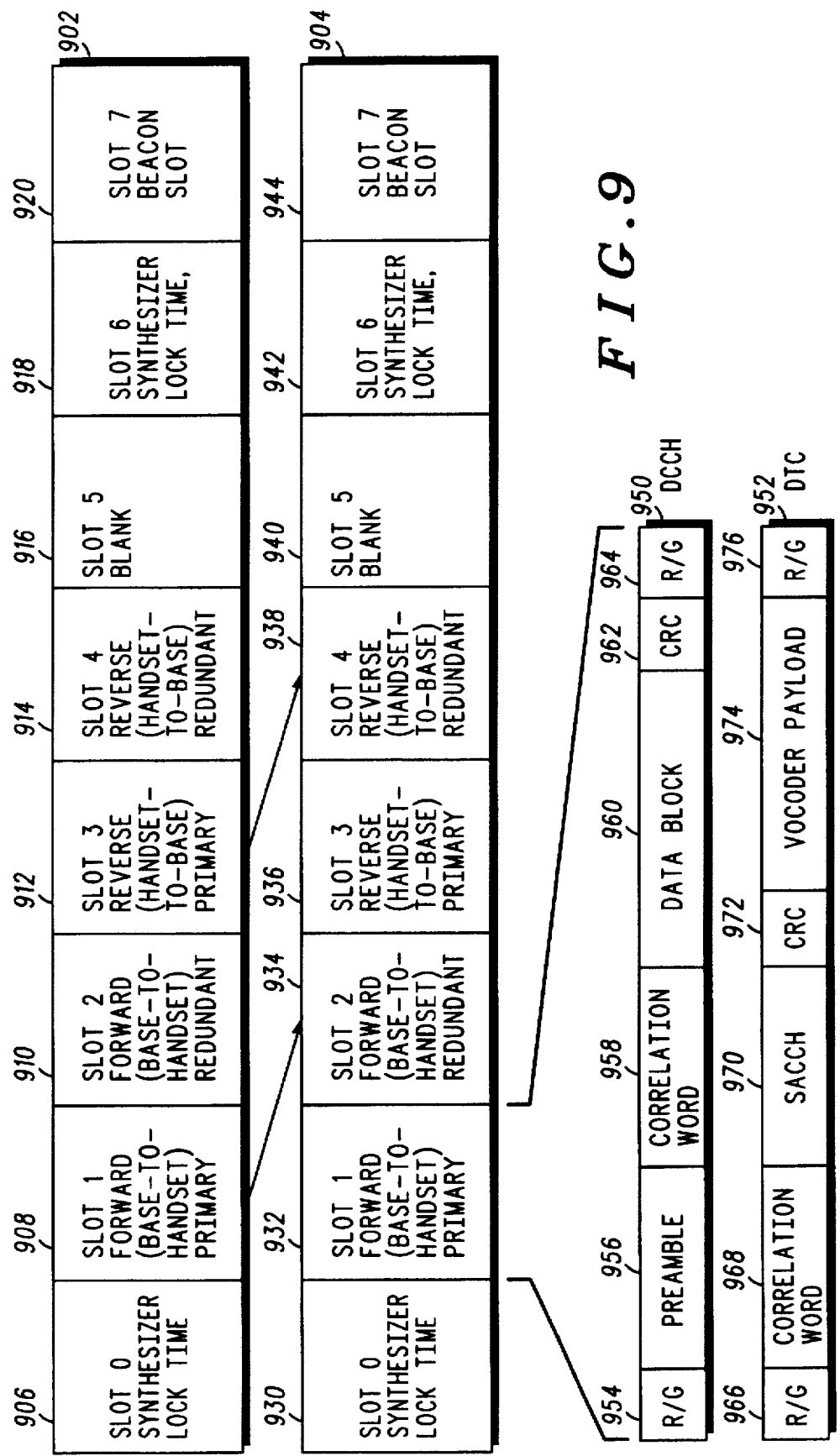
FIG. 9 is a second embodiment of an air interface protocol having a single sync slot and a blank slot for coordinating base stations and handsets.
Figure 10:
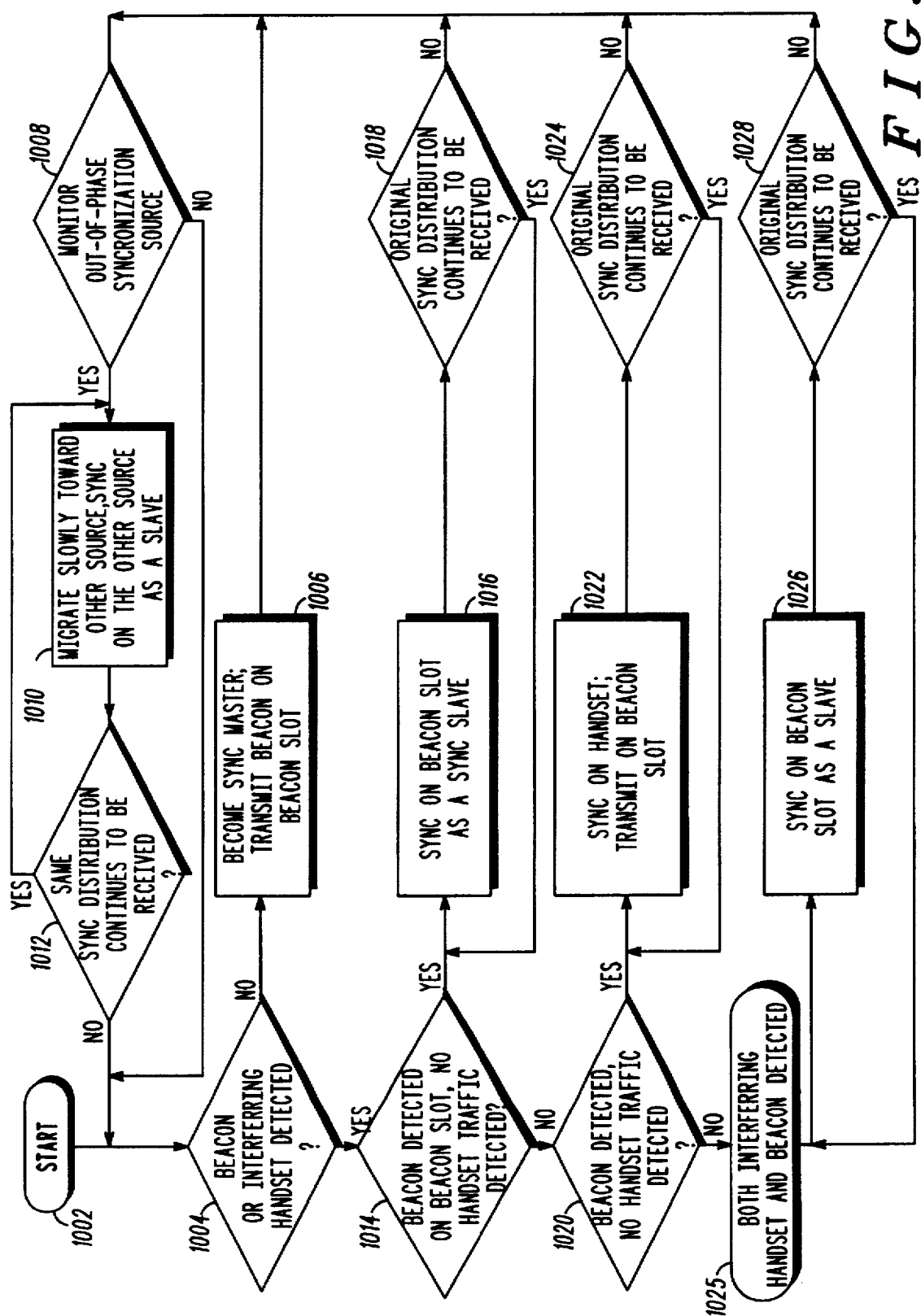
FIG. 10 is a detailed flow diagram showing the coordination of base stations having the air interface protocol shown in FIG. 9.

As shown in FIG. 6, the method synchronizing individual chains of base stations is shown generally. The growth of the chain can be either between base stations (i.e. each base station syncs off another base station based upon a beacon message (FIGS. 7 and 8)), or a more dynamic chain with base stations detecting a beacon message or handset traffic associated with another base to form a chain (FIGS. 9 and 10). While the general concept of chain building described in FIG. 6 applies to either method for forming a synchronous chain, the general implementation for each configuration will be described separately below for ease of understanding.

In particular, the development of a synchronization chain between base stations is started at a step 602 wherein one base station becomes synchronized upon power up to an existing base station according to the steps described in FIG. 3. A base station may also be within range of and detect two sync sources. A base station determines whether a second beacon message from an unsynchronized base station is detected at step 604. If no such beacon message is detected, the base station continues synchronizing on the existing master at a step 606. However, if a second beacon message from a base station is detected, the base station synchronizes to the detected unsynchronized base station at a step 608. The base station migrates slowly towards the other base station to avoid any interruption in communication. The base station then determines whether the synchronization is completed at a step 610. If the synchronization is not completed, the base station continues to migrate slowly towards the other base station at step 608. If synchronization is completed, the base station will assume normal operation at a step 612. The base station will then determine whether the same sync distribution is received at a step 614. If the same sync distribution is received, the base station will assume normal operation at step 612. Otherwise, the base station will check for a second beacon signal or non-synched handset traffic at step 604. One method for migrating toward another base station is described below in reference to FIG. 11.

Using the A1–A5 chain as an example, at a time T1, a base station A1 exists as an original master base station. A second base station A2 is then powered up, detects A1 and syncs to A1. A third base station A3 is then powered up. According to FIG. 3 of the present invention, A3 detects a sync source (A2) and syncs to the sync source. The chain continues to build as base stations which are powered up sync to the chain. In summary, when a base station is added to either end of the chain (i.e. is being powered up and looking for a master), the base station will sync to the chain.

At a time t2, the two synchronization chains may meet and will form a single chain of synchronized base stations C1–C9. The new base station which bridges the two chains of base stations (designated as base station C4 at time t2) will detect a first base station and sync to that base station. While C4 is within range of and could detect either C3 or C5, any collision avoidance technique could be employed to determine which base station to which C3 will sync. As will be described in detail below, the base station could sync by default to one of the two base stations. The method for default will depend upon the sychronization protocol. Assuming for example that C4 first syncs to C5, C3 (which is synced to C2) will then detect the second base station (C4) which is now out of sync and will sync to that base station. C2 (which is synced to C1) will then detect a second sync source which is out of sync (C3), and C2 will sync to C3. Finally, C1 will be out of sync with C2 and will then sync to C2 to complete the synchronization chain reversal. C1 thus relinquishes master. Accordingly, the method of the present invention will enable synchronization chains to be formed, and particularly for enabling single synchronization chains to be formed when two synchronization chains collide.

Similarly, the development of a synchronization chain based upon detecting both beacon signals and handset traffic is also described in reference to FIGS. 5 and 6. While a base station will transmit a beacon signal when power is applied to the base station, the term "power up" will also refer to the transmission of handset traffic when a base station is in a call. A base station determines whether a beacon signal or non-synced handset traffic is detected at step 604. If neither a beacon signal nor non-synced handset traffic is detected, the base station remains in the loop at a step 606. However, if a beacon signal or non-synced handset traffic is detected, the base station synchronizes to the detected base station at a step 608. The base station migrates slowly towards the detected base station to avoid any interruption in communication. The base station then determines whether the synchronization is completed at a step 610. If the synchronization is not completed, the base station continues to migrate slowly towards the other synchronization source at step 608. If synchronization is completed, the base station will assume normal operation at a step 612. The base station will then determine whether the same sync distribution is received at a step 614. If the same sync distribution is received, the base station will assume normal operation at step 612. Otherwise, the base station will check for a second beacon signal or non-synched handset traffic at step 604.

Using the A1–A5 chain again as an example, A1 is a base station exists as an original master. A base station A2 is powered up, detects a beacon signal from A1 and syncs to A1. Another base station A3 is then powered up. According to the operation of the present invention, if base station A2 is in a call, A3 detects the A2 handset traffic and syncs to A2. A3 transmits a beacon. Base station A4 is then powered up and synchronizes with base station A3. If another base station (A5) is powered up, it will sync to handset traffic of base station A4. In summary, the base stations detect either a beacon signal or handset traffic and synchronize to the source of the beacon signal or handset traffic to form chains.

At a time t2, the two synchronization chains may meet and will form a single chain of synchronized devices C1–C9. The base station which bridges the two chains (designated as C4 at time t2) will sync to one of the two devices. While base station C4 is within range of and could detect either C3 or C5, any collision avoidance technique could be employed to determine which base station to which C3 will sync. Assuming for example that handset C4 first syncs to C5, C3 will then detect either a beacon signal or handset traffic of C4 which is out of sync and will sync to C4. C2 will then detect a second source which is out of sync (C3), and C2 will sync to C3. Finally, C1 will be out of sync with C2 and will then sync to C2 to complete the synchronization chain reversal. C1 thus relinquishes mastership.

Figure 7:
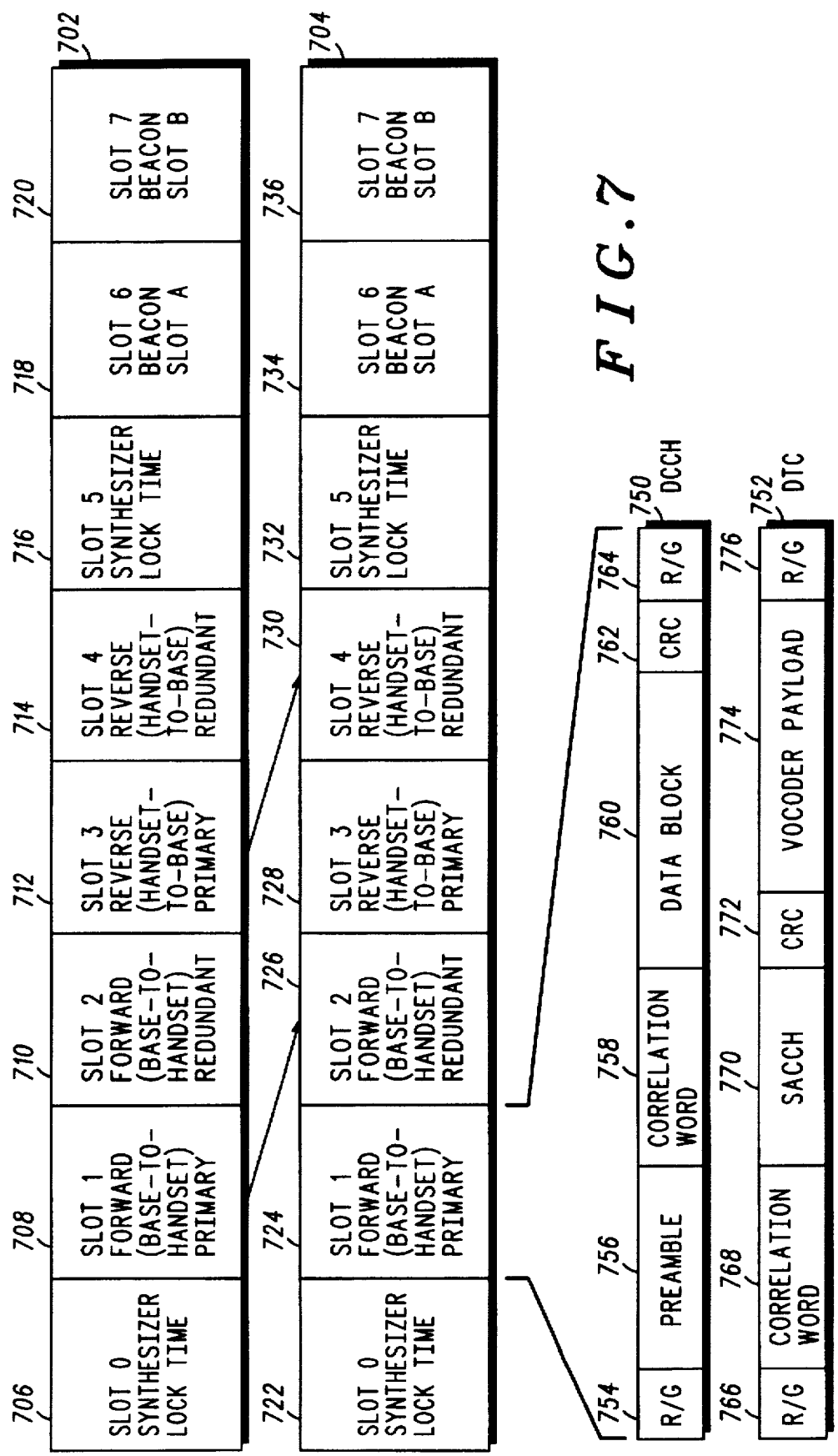
FIG. 7 is a first embodiment of an air interface protocol having multiple sync slots for coordinating base stations.

Considering now the protocol for synchronizing communication devices, the preferred methods for synchronizing the communication devices in a chain will be described in detail in reference to FIGS. 7–10. Turning first to FIG. 7, an air interface protocol for synchronizing base stations is shown. Preferably, both primary and redundant frames 702 and 704 are transmitted between the base stations as shown in FIG. 7. A method and apparatus for maintaining frequency and bit synchronization having primary and redundant frames is described in Pickert et al., U.S. Pat. No. 5,212,715 entitled "Digital Communication Signalling System" which issued on May 18, 1993. Referring to the specific slots, frame 702 includes a slot 706 for synthesizer lock time. The following four slots are for forward primary and forward redundant data fields and reverse primary and reverse redundant data fields. In particular, slot 708 is for a forward (base-to-handset) primary data slot. Slot 710 is a forward redundant data field. Slot 712 is a reverse (handset-to-base) primary data field, while slot 114 is a reverse redundant data field. Slot 716 is a synthesizer time slot. The following two slots are beacon slots, designated as beacon slot A 718 (slot A) and beacon slot B 720 (slot B). The beacon slot is used to transmit a base synchronization field which is used to synchronize the base stations. A beacon message would comprise a plurality of beacon signals transmitted on the beacon slot. The function of beacon slot A and beacon slot B will be described in detail in reference to FIG. 8.

As shown in FIG. 7, the forward primary time slot 708 of primary frame 702 is also transmitted in forward redundant slot 726 of the redundant frame 704. That is, the redundant slot contains information matching the prior frames primary slot. Similarly, the reverse primary slot 712 of primary frame 702 is transmitted in the reverse redundant slot 730 of redundant time frame 704. The operation of transmission of primary and redundant data fields is well known in the art and will not be described in further detail. However, it will be understood that a system transmitting a redundant slot need not be employed according to the present invention, and a single frame could be transmitted.

FIG. 7 also shows the preferred slot structure for a data slot either the forward or reverse direction, or a primary slot or a redundant slot in either direction. The preferred fields for a digital control channel (DCCH) field 750 is shown. Each DCCH data slot comprises a ramp/guard (R/G) field 754, a preamble field 756, a sync field 758, a data field 760, a cyclic redundancy check (CRC) field 762 and a R/G field 764. A digital traffic field 752 is also shown. The preamble field represents a marker signal for identifying the base station. In the reverse channel, the marker signal would identify the handset. The digital traffic channel data slot comprises a R/G field 766, a sync field 768, a slow associated control channel (SACCH) 770, a CRC field 772, a vocoder payload field 774, and a R/G field 776. While the preferred data field protocol is described in FIG. 7, additional or fewer fields may be transmitted within the scope of the present invention.

Figure 8:
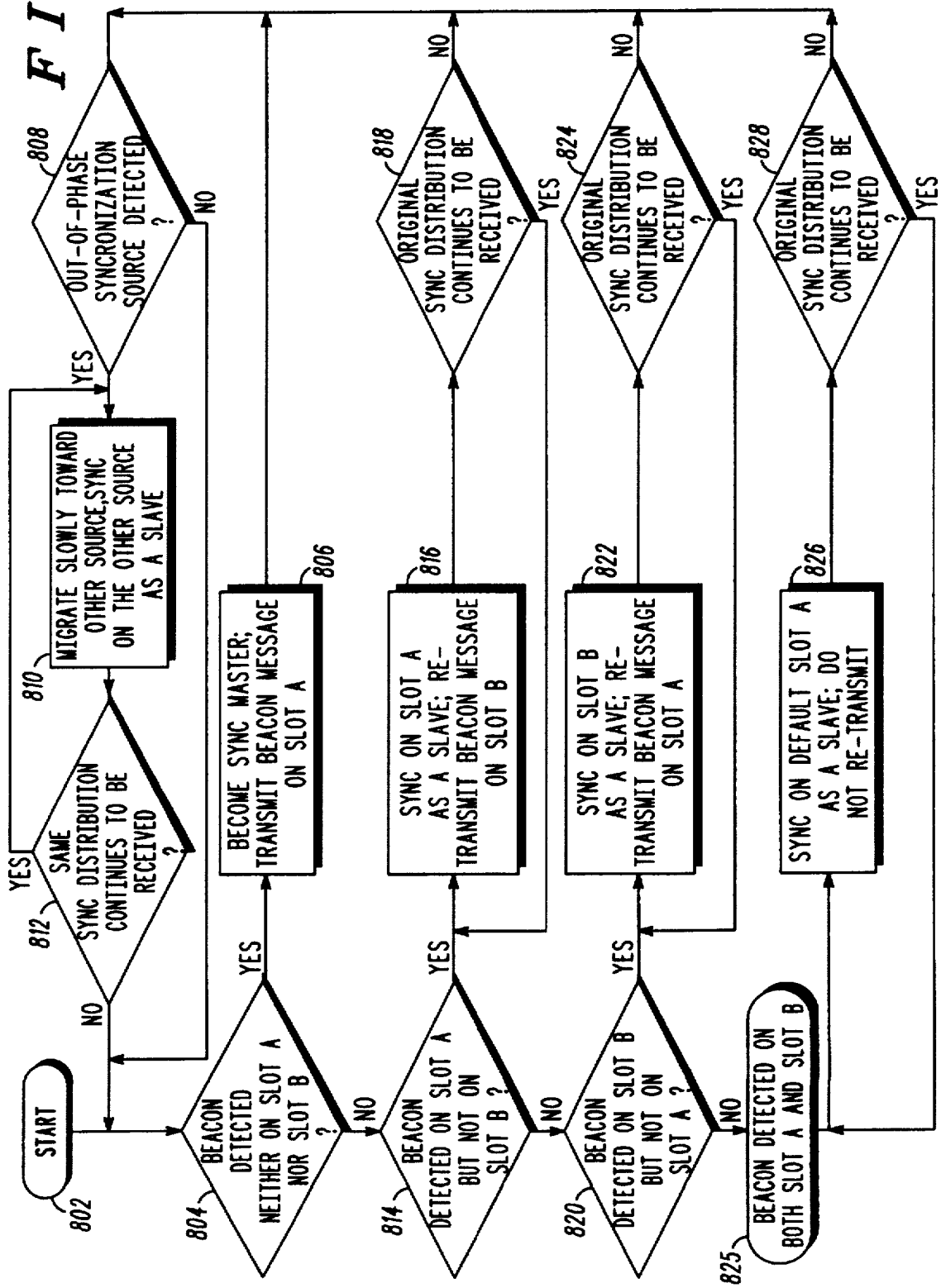
FIG. 8 is a detailed flow diagram showing the coordination of base stations having the air interface protocol shown in FIG. 7.

Referring now to FIG. 8, the preferred steps for synchronizing base stations employing the air protocol of FIG. 7 is described. In particular, at a step 804, the base station determines whether a beacon message is acquired on either slot A or slot B. If no beacon is acquired on either slot A or slot B, the base station becomes a synchronization master and transmits a beacon message on slot A at a step 806. The base station then monitors for an out-of-phase synchronization source at a step 808. If no out-of-phase synchronization source is detected, the base station continues to determine whether a beacon message is acquired on slot A or slot B at step 804. If an out-of-phase synchronization source is detected at step 808, the base station syncs on the other base station as a slave at step 810. The base station then determines if the same sync distribution continues to be received at a step 812 (i.e. the same, previously-detected synchronization source is the only synchronization source which is detected). If the same sync distribution continues to be received, the base station syncs on the other base station as a slave at step 810.

However, if a new sync distribution is received at step 812, the base station determines whether a sync is acquired on slot A or slot B at step 804. If a sync is acquired on slot A, but not on slot B at a step 814, the base station syncs on slot A as a slave, and retransmits a beacon message on slot B at a step 816. If the original sync distribution continues to be received at a step 818, the base station continues to sync on slot A as a slave and retransmit on slot B. However, if the sync distribution does not continue, the base station monitors for an out-of-phase sync source at step 808.

If the base station detects a beacon on slot B, but not on slot A, at a step 820, the base station syncs on slot B as a slave and retransmits a beacon on slot A at a step 822. If the original sync distribution continues to be received at a step 824, the base station continues to sync on slot B as a slave and retransmit on slot A. However, if the original sync distribution is not received, the base station monitors for out-of-phase synchronization source at step 808.

Finally, if a sync is acquired both on slot A and slot B at step 825, the base station syncs on one of the slots. By way of example, the base station could sync to a default slot (e.g. slot A) at step 826. If the original sync distribution continues to be received at step 828, the base station continues to sync on slot A as a slave. Otherwise, the base station monitors for an out-of-phase synchronization source at step 808.

In summary, base station monitors two beacon slots to detect an unsynchronized source. If no beacon signal is detected in either beacon slot, the base station functions as a master base station. If the base station detects a beacon signal on one of the beacon slots, the base stations synchronizes to that base station, and retransmits a beacon signal on the other beacon slot to enable another base station to synchronize to it. If a certain base station detects a beacon on both slot A and slot B simultaneously (i.e. a beacon from two base stations), the base station will synchronize to one of the base stations. The other of the two base stations will then detect that the certain base station is out of sync and will sync to that base station. Accordingly, all of the base stations of separate chains will be synchronized.

Turning now to FIG. 9, an alternate embodiment of an air interface protocol for synchronizing base stations in a chain is shown. As shown in FIG. 9, frame 902 includes a slot 906 for synthesizer lock time. The following four slots are for forward primary and forward redundant data fields, and reverse primary and reverse redundant data fields. In particular, slot 908 is for a forward (base-to-handset) primary data slot. Slot 910 is a forward redundant data field. Slot 912 is a reverse (handset-to-base) primary data field, while slot 914 is a reverse redundant data field. At least one blank slot 916 is also included to allow for detecting handset traffic in the alternate embodiment. Slot 918 is a synthesizer lock time slot, followed by a single slot, designated as beacon slot 918. The function of the beacon slot will be described in detail in reference to FIG. 10. While both primary and redundant frames 902 and 904 are preferably transmitted between the base stations as shown in FIG. 7, a single time frame could be transmitted. Also, the DCCH and DTC data fields described in FIG. 7 could also be employed in the alternate embodiment.

Turning now to FIG. 10, the preferred steps for the alternate embodiment for synchronizing base stations employing the air protocol of FIG. 9 having at least one blank slot and a single beacon slot is described. At a step 1004, if no beacon is detected on the beacon slot and no non-synched handset traffic is detected on the blank slot, the base station becomes a synchronization master and transmits a beacon message on the beacon slot at a step 1006. The base station then monitors for an out-of-phase synchronization source on the blank slot at a step 1008. If no out-of-phase synchronization source is detected, the base station continues to determine whether a beacon message is acquired on the beacon slot or non-synced handset traffic is detected on the blank slot at step 1004. If an out of phase handset is detected at step 1008, the base station migrates slowly toward the other source and syncs on the handset as a slave at step 1010. The base station then determines if the same sync distribution continues to be received at a step 1012. If the same sync distribution continues to be received, the base station continues to sync on the other handset as a slave at step 1010.

However, if a new sync distribution is received at step 1012, the base station determines whether a beacon message is acquired on the beacon slot or handset traffic is detected on the blank slot at step 1004. If a beacon message is detected on the beacon slot and no non-synched handset traffic is detected on the blank slot at a step 1014, the base station syncs on the beacon slot as a slave at a step 1016. If the original sync distribution continues to be received at a step 1018, the base station continues to sync on the beacon slot as a slave. However, if the sync distribution does not continue, the base station monitors for an out-of-phase sync source at step 1008.

If the base station detects non-synched handset traffic on the blank slot, but no beacon on the beacon slot at a step 1020, the base station syncs on the blank slot as a slave at a step 1022. If the original sync distribution continues to be received at a step 1024, the base station continues to sync on the blank slot as a slave and retransmits on the beacon slot. However, if the original sync distribution is not received, the base station monitors for out-of-phase synchronization source at step 1008.

Finally, if a beacon message is detected on the beacon slot and interfering handset traffic is detected on the blank slot at step 1025, the base station syncs on the beacon slot as a slave at a step 1026. If the original sync distribution continues to be received at step 1028, the base station continues to sync on the beacon slot as a slave. Otherwise, the base station monitors for an out-of-phase synchronization source at step 1008.

In summary, an alternate embodiment discloses base stations which monitor a beacon signal on a beacon slot or handset traffic on a blank slot to detect an unsynchronized source. If no beacon signal is detected on the beacon slot and no handset traffic is detected on the blank slot, the base station functions as a master base station. If the base station detects a beacon signal on the beacon slots or handset traffic on the blank slot, the base stations synchronizes to that base station. If handset traffic was detected, the base station also retransmits a beacon signal on the beacon slot to enable another base station to synchronize to it. If a certain base station detects a beacon on the beacon slot and handset traffic on the blank slot, the base station will synchronize to one of the base stations, preferably the base station detected on the beacon slot. The other of the two base stations will then detect that the certain base station is out of sync and will sync to that base station. Accordingly, all of the base stations of separate chains will be synchronized.

Turning now to FIG. 11, a preferred method for achieving or maintaining synchronization by use of a DPLL is disclosed. In particular, a slot is established as a sync source at a step 1104.

The base station will then determine whether a beacon is received at a step 1106. If a beacon is received, the base station will then determine whether the beacon is received early at a step 1108. If the beacon is received early, the base station will transmit a frame having a guard band which has N−1 bits at a step 1110. If however the beacon is not received early, the base station will transmit a guard band having N+1 bits. While the method of FIG. 11 is one method for maintaining synchronization, it will be understood that other methods which are known in the art could be employed to maintain synchronization.

In summary, the present invention provides synchronous communication in a communication environment wherein multiple base stations are adapted to operate on the same frequencies. In particular, base stations such as residential base stations must be coordinated to minimize interference with other base stations which otherwise operate independently. According to the present invention, each base station operating in a system will determine whether another base station operating on the same frequencies is within range. One of the base stations will assume a role as a master and the remaining base station will then synchronize to the master base station. Preferred methods for synchronizing the base stations, including signaling protocols and collision avoidance techniques, are also disclosed.

While specific embodiments are described by way of example in the above description, modifications and alternate embodiments fall within the spirit and scope of the present invention. The present invention should be limited only by the following claims.

We claim:

1. A method for providing synchronous communication in a communication system having a plurality of base stations adapted to operate within range of one another, said method comprising the steps of:

detecting a beacon signal from a first base station and a second base station at a third-base station;

synchronizing said third base station to said first base station;

detecting, at said second base station, a beacon signal from a third base station; and synchronizing said second base station to said third base station.

2. The method for providing synchronous communication according to claim 1 wherein said step of detecting a beacon signal from said third base station comprises detecting handset traffic from a handset associated with said third base station.

3. The method for providing synchronous communication according to claim 1 wherein said step of detecting said beacon signal from said third base station includes detecting handset traffic on a blank slot of a message frame associated with said third base station.

4. A method for providing synchronous communication in a communication system having a plurality of base stations adapted to operate within range of one another, said method comprising the steps of:

detecting a beacon signal from each of a first base station and a second base station at a third base station;

synchronizing said third base station to said first base station;

generating a beacon signal at said third base station;

detecting, at said second base station, said beacon signal generated at said third base station; and synchronizing said second base station to said third base station.

5. A method for providing synchronous communication in a communication system having a plurality of base stations adapted to operate within range of one another, said method comprising the steps of:

detecting a beacon signal from each of a first base station and a second base station at a third base station;

synchronizing said third base station to said first base station;

detecting at said second base station handset traffic from a handset adapted to communicate with said third base station; and synchronizing said second base station to said third base station based upon said handset traffic.

* * * * *